(12) United States Patent
Dai

(10) Patent No.: US 12,131,755 B2
(45) Date of Patent: Oct. 29, 2024

(54) METHOD FOR STORING MULTI-LENS RECORDING FILE AND MULTI-LENS RECORDING APPARATUS

(71) Applicant: Wistron Corporation, New Taipei (TW)

(72) Inventor: Jing-Jhe Dai, New Taipei (TW)

(73) Assignee: Wistron Corporation, New Taipei (TW)

( * ) Notice: Subject to any disclaimer, the term of this patent is extended or adjusted under 35 U.S.C. 154(b) by 127 days.

(21) Appl. No.: 18/089,522

(22) Filed: Dec. 27, 2022

(65) Prior Publication Data

US 2024/0161786 A1    May 16, 2024

(30) Foreign Application Priority Data

Nov. 14, 2022  (TW) .................................. 111143445

(51) Int. Cl.
*H04N 13/189*   (2018.01)
*G11B 27/32*    (2006.01)

(52) U.S. Cl.
CPC ......... *G11B 27/326* (2013.01); *H04N 13/189* (2018.05)

(58) Field of Classification Search
CPC ...... G11B 27/326; H04N 13/189; H04N 5/77; G07C 5/0866
USPC ...................................................... 386/241
See application file for complete search history.

(56) References Cited

U.S. PATENT DOCUMENTS

| | | | | |
|---|---|---|---|---|
| 5,768,162 A | * | 6/1998 | Rupp ................... | G06F 11/349 709/200 |
| 6,934,464 B1 | * | 8/2005 | Ayaki .................. | G11B 27/329 |
| 7,863,552 B2 | * | 1/2011 | Cartlidge ............. | G06T 3/10 359/368 |

(Continued)

FOREIGN PATENT DOCUMENTS

| | | |
|---|---|---|
| CN | 107302676 | 10/2017 |
| CN | 106600750 | 5/2019 |

(Continued)

OTHER PUBLICATIONS

"Search Report of Europe Counterpart Application", issued on Sep. 5, 2023, p. 1-p. 9.

(Continued)

*Primary Examiner* — Helen Shibru
(74) *Attorney, Agent, or Firm* — JCIPRNET

(57) ABSTRACT

A method for storing multi-lens recording file and multi-lens recording apparatus are provided. When at least one lens is driven for loop recording, a total recording capacity for loop recording is calculated based on setting data of the at least one lens driven. When a remaining capacity of a storage space is less than the total recording capacity, a file cleaning action is performed on multiple recorded files stored in the storage space for at least one lens. The file cleaning action includes: deleting the at least one recorded file stored in the storage space based on a recording time and a lens number until the remaining capacity is no less than the total recording capacity. When the remaining capacity of the storage space is no less than the total recording capacity, loop recording is performed through at least one lens being driven and a currently recorded file is stored.

20 Claims, 3 Drawing Sheets

(56) References Cited

U.S. PATENT DOCUMENTS

| | | | | |
|---|---|---|---|---|
| 8,310,540 B2* | 11/2012 | DeKeyser | ............... | H04N 7/183 |
| | | | | 348/143 |
| 9,036,982 B2* | 5/2015 | Hosokawa | ............... | H04N 5/76 |
| | | | | 386/326 |
| 9,467,734 B2* | 10/2016 | Chang | ................. | H04N 21/4335 |
| 10,965,978 B2* | 3/2021 | Hayashibara | ...... | H04N 21/4825 |
| 11,868,029 B2* | 1/2024 | Hayasaka | ............. | G03B 17/565 |
| 2003/0204535 A1* | 10/2003 | Harada | ................. | G11B 27/034 |
| 2008/0159709 A1* | 7/2008 | Moteki | ................. | H04N 9/8042 |
| | | | | 386/E9.013 |
| 2009/0003162 A1* | 1/2009 | Moteki | ................... | H04N 5/781 |
| | | | | 369/53.1 |
| 2009/0161500 A1* | 6/2009 | Moteki | ................. | G11B 27/329 |
| 2019/0379822 A1* | 12/2019 | Leong | ...................... | G06F 3/012 |
| 2022/0070453 A1* | 3/2022 | Tang | ........................ | G06V 10/82 |
| 2023/0283913 A1* | 9/2023 | Horie | ......................... | G06T 5/00 |
| | | | | 348/222.1 |

FOREIGN PATENT DOCUMENTS

| | | |
|---|---|---|
| TW | 200615862 | 5/2006 |
| TW | 200632507 | 9/2006 |

OTHER PUBLICATIONS

"Office Action of Taiwan Counterpart Application", issued on Feb. 3, 2023, p. 1-p. 5.

* cited by examiner

METHOD FOR STORING MULTI-LENS RECORDING FILE AND MULTI-LENS RECORDING APPARATUS

CROSS-REFERENCE TO RELATED APPLICATION

This application claims the priority benefit of Taiwan application serial no. 111143445, filed on Nov. 14, 2022. The entirety of the above-mentioned patent application is hereby incorporated by reference herein and made a part of this specification.

BACKGROUND

Technical Field

The disclosure relates to a storage mechanism, and more particularly, a method for storing multi-lens recording file and a multi-lens recording apparatus.

Description of Related Art

The loop recording function of driving recorder is different from normal video recording. The driving recorder needs to record for a long time and without intervals to avoid missing the file of important or collision events. Loop recording is used on all of the driving recorders on the market so as to record continuously. Older video files are deleted when the storage capacity is full, and then new video files are continuously written, so that the driving recorder may function properly.

Currently, the host and the lens of a split-type driving recorder are separated, usually equipped with a dual lens or multiple lenses of three or more. However, when multiple lenses are used simultaneously on the same host for loop recording, the storage space drops quickly and may become uneven as lenses are switched on and off, making it impossible to guarantee that sufficient space is available for each of the lenses to store the recorded video. When the writing of a file is finished, there is no way to check if there is sufficient space as other cameras are still writing their files, making it easier to miss seconds or lose files. For this reason, typical designs always reserve a storage space equal to the maximum size of the video file multiplied by the number of lenses. When it falls below the reserved storage space, old video files will start to be deleted to ensure that there is no space problem for each writing of files. However, this requires a large amount of storage space, and once the settings for the resolution, the frames per second (FPS), the loop recording time, and the file compression format, etc. have been changed, the original settings for the reserved storage space will not be applicable.

SUMMARY

The disclosure provides a method for storing multi-lens recording file and a multi-lens recording apparatus, which may reserve storage space according to the amount of the lens.

The method for storing multi-lens recording file of the disclosure is adapted for being executed by a processor, which is described below. A total recording capacity of at least one lens for loop recording is calculated in response to at least one of multiple lenses being driven to perform the loop recording based on respective setting data of the at least one lens being driven. Each of the lenses has a lens number correspondingly. Whether the remaining capacity of the storage space is less than the total recording capacity is determined. A file cleaning action is performed on multiple recorded files stored in the storage space by the at least one lens in response to the remaining capacity being less than the total recording capacity, which is described below. At least one recorded file stored in the storage space is deleted based on the recording time and the lens number, until the remaining capacity is no less than the total recording capacity. The loop recording is performed through the at least one lens being driven and a currently recorded file is stored in response to the remaining capacity being no less than the total recording capacity.

In an embodiment of the disclosure, in response to a first lens among the lenses being driven, the file cleaning action is described below. Whether a first amount of the recorded files corresponding to the first lens stored in the storage space is greater than a default amount is determined based on the lens number of the first lens. An earliest recorded file among the recorded files corresponding to the first lens is deleted based on the recording time in response to the first amount being greater than the default amount.

In an embodiment of the disclosure, after determining whether the first amount of the recorded files corresponding to the first lens stored in the storage space is greater than the default amount, a second lens is decided among remaining lenses of the lenses in response to the first amount not being greater than the default amount, where a second amount of the recorded files corresponding to the second lens stored in the storage space is greater than the default amount. The earliest recorded file among the recorded files corresponding to the second lens is deleted based on the recording time.

In an embodiment of the disclosure, after determining whether the first amount of the recorded files corresponding to the first lens stored in the storage space is greater than the default amount, a second lens is decided among remaining lenses of the lenses in response to the first amount not being greater than the default amount, where a second amount of the recorded files corresponding to the second lens stored in the storage space is greater than the default amount. A recorded file with a largest file size among the recorded files corresponding to the second lens is deleted based on a file size.

In an embodiment of the disclosure, in response to multiple lenses among the lenses being driven, the file cleaning action is described below. For each of the lenses being driven, whether a first amount of the recorded files corresponding to each of the lenses stored in the storage space is greater than a default amount is determined based on the lens number of each of the lenses. The earliest recorded file among the recorded files corresponding to each of the lenses in response to the first amount being greater than the default amount is deleted based on the recording time.

In an embodiment, after determining whether the first amount of the recorded files corresponding to each of the lenses stored in the storage space is greater than the default amount, For lenses for which the first amount is not greater than the default amount, the earliest recorded file among the recorded files corresponding to another lens stored in the storage space is deleted based on the recording time, where a second amount of the recorded files corresponding to the another lens stored in the storage space is greater than the default amount.

In an embodiment, after determining whether the first amount of the recorded files corresponding to each of the lenses stored in the storage space is greater than the default amount, For lenses for which the first amount is not greater than the default amount, a recorded file with a largest file size among the recorded files corresponding to another lens stored in the storage space is deleted based on a file size. where a second amount of the recorded files corresponding to the another lens stored in the storage space is greater than the default amount.

In an embodiment of the disclosure, the setting data includes a resolution, frames per second, a loop recording time, and a file compression format. The process of calculating the total recording capacity of the at least one lens for the loop recording is described below. A file size is calculated correspondingly based on the resolution, the frames per second, the loop recording time, and the file compression format corresponding to each of the at least one lens being driven. The total recording capacity is obtained by summing up the file size corresponding to the lens being driven.

In an embodiment of the disclosure, the method is further elaborated as below. Multiple queues are set up respectively for the lenses, where each of the queues is configured to record file information of the recorded file stored in the storage space by each of the lenses.

In an embodiment of the disclosure, the method is further elaborated as below. Whether the setting data of the lens being driven is updated is determined. The total recording capacity for the loop recording of the lens is recalculated in response to the setting data being updated.

The multi-lens recording apparatus of the disclosure includes multiple lenses, a storage, and a processor. The storage includes a storage space. The processor is coupled to the lenses and the storage and configured to execute the method for storing multi-lens recording file.

Based on the above, the disclosure may estimate the file size of a single file recorded by each of the lenses according to setting data of the lens being driven, and reserve the required storage space to ensure that each of the lenses may record a complete file. Accordingly, the reserved storage space may be changed, and more storage space may be used for storage.

DESCRIPTION OF THE EMBODIMENTS

Figure 1:
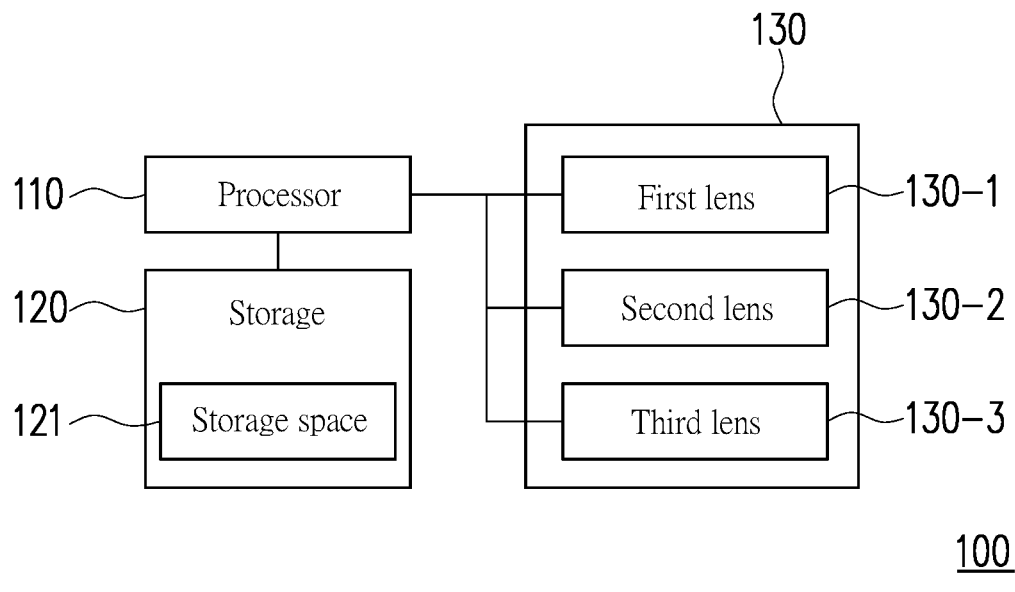
FIG. 1 is a block diagram of a multi-lens recording apparatus according to an embodiment of the disclosure.

FIG. 1 is a block diagram of a multi-lens recording apparatus according to an embodiment of the disclosure. Referring to FIG. 1, a multi-lens recording apparatus 100 is, for example, a driving recorder, a robot, a monitoring system, and the like. The multi-lens recording apparatus 100 includes a processor 110, a storage 120, and multiple lenses 130. In this embodiment, three lenses are shown for illustration, that is, the first lens 130-1, the second lens 130-2, and the third lens 130-3, but not limited thereto. The amount of the lens 130 may be 2, 4, or more.

The processor 110 is, for example, a central processing unit (CPU), a physical processing unit (PPU), a programmable microprocessor, an embedded control chip, a digital signal processor (DSP), an application specific integrated circuits (ASIC), or other similar devices.

The storage 120 may be implemented by, for example, any type of fixed or removable random access memory (RAM), read-only memory (ROM), flash memory, hard disk, or other similar device or a combination of these devices.

The lens 130 may be implemented by using a charge coupled element (CCD) lens, a complementary metal oxide semiconductor transistor (CMOS) lens, and the like.

A storage space 121 is set in the storage 120 to store the recorded file of the lens 130. The storage 120 also stores at least one code snippet. After the above code snippet is installed, the processor 110 executes the following method for storing multi-lens recording file.

Figure 2:
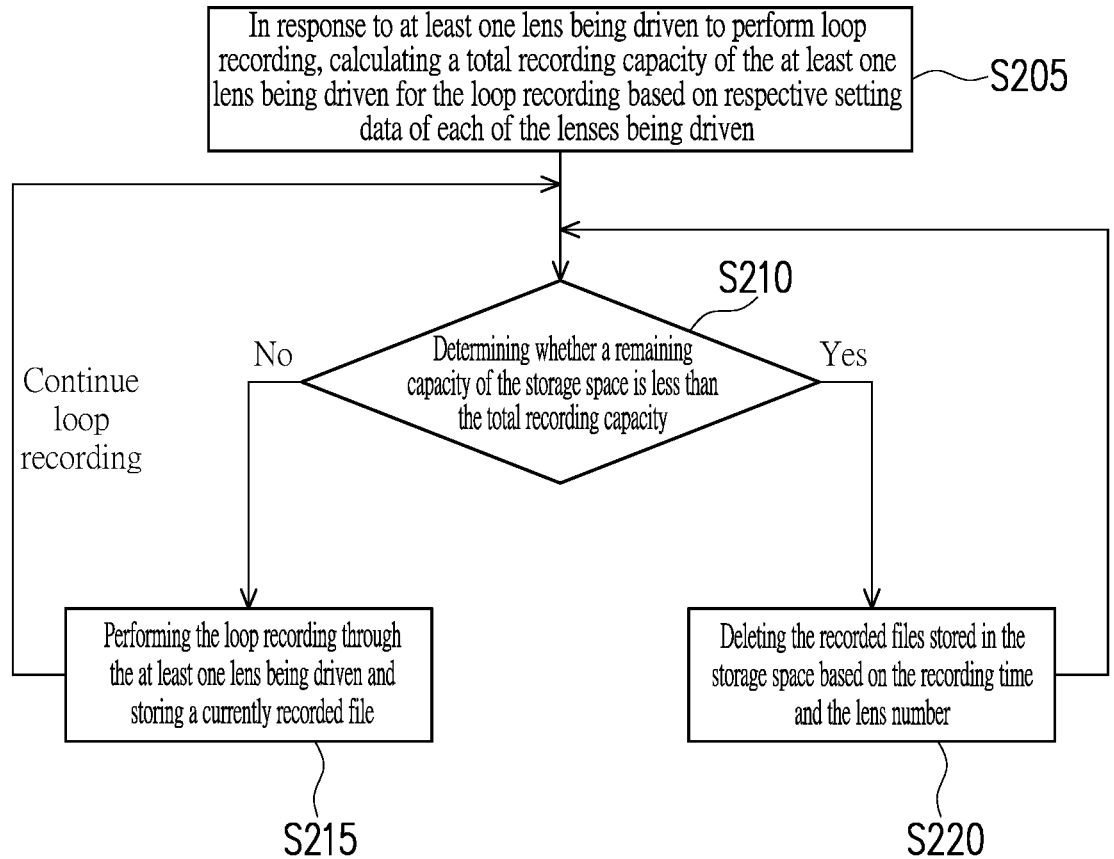
FIG. 2 is a flow diagram of a method for storing multi-lens recording file according to an embodiment of the disclosure.

FIG. 2 is a flow diagram of a method for storing multi-lens recording file according to an embodiment of the disclosure. Referring to FIG. 1 and FIG. 2, in step S205, in response to at least one lens 130 being driven to perform loop recording, the processor 110 calculates the total recording capacity of the lens 130 being driven for loop recording based on setting data of each of the lenses 130 being driven.

In response to the multi-lens recording apparatus 100 being turned on, the processor 110 calculates the file size of a single file recorded by each of the lenses 130 according to the setting data of the lenses 130 being driven (one or more). In this way, required space may be reserved in the storage space 121 to ensure that each of the lenses 130 may record a complete file.

Setting data includes a resolution, frames per second (FPS), a loop recording time, and a file compression format. The processor 110 calculates the file size correspondingly based on the resolution, the frames per second, the loop recording time, and the file compression format corresponding to each of the lenses 130 being driven. The setting data of each of the lenses 130 being driven is assumed to be as follows: the file compression format is Motion JPEG (Joint Photographic Experts Group), the resolution is 720×480, the frames per second is 10, and the loop recording time is 3 minutes. As a result, the file size of a single recording file of each lens 130 being driven is 82.5 MB. If the boot-up setting is set to drive only one first lens 130-1, the total recording capacity is 82.5 MB. If the boot-up setting is set to drive the first lens 130-1, the second lens 130-2, and the third lens 130-3 at the same time, the total recording capacity is 247.5 (82.5×3) MB. In other embodiments, the setting data of each of the lenses being driven may also be different, which is not limited herein.

Next, in step S210, the processor 110 determines whether the remaining capacity of the storage space 121 is less than the total recording capacity. Before starting to record through the lens 130, the processor 110 determines whether the remaining capacity is sufficient.

If the remaining capacity is less than the total recording capacity, in step S220, the processor 110 performs a file cleaning action on the recorded files stored in the storage space 121 by each of the lenses 130 being driven. That is, the processor 110 deletes at least one recorded file stored in the storage space 121 based on the recording time and a lens number, and returns to step S210 until the remaining capacity of the storage space 121 is no less than the total recording capacity. Each of the lenses 130 has a lens number correspondingly, and each of the recorded files has information related to the lens number of the corresponding lens 130.

In an embodiment, it may be set to: in response to the remaining capacity of the storage space 121 being insufficient, the recorded file corresponding to the lens 130 being driven is first deleted. In order to maintain a balance of the recorded files stored by each of the lenses 130, it may be further set to: keeping the amount of the recorded files stored in the storage space 121 by the lens 130 being driven not less than the default amount. That is, in response to the remaining capacity of the storage space 121 being insufficient and the recorded files stored in the storage space 121 by the lens 130 being driven being greater than the default amount, the earliest recorded file is deleted based on the recording time. In response to the amount of the recorded files stored in the storage space 121 by the lens 130 being driven not being greater than the default amount, another lens is decided among other remaining lenses. The amount of the recorded files stored in the storage space 121 by the another lens is greater than the default amount. The earliest recorded file among the recorded files corresponding to the another lens is deleted. In addition, it may also be set to: deleting the recorded file with the largest file size.

For example, with the first lens 130-1 being driven, is it assumed that the lens number of the first lens 130-1 is "Video1", the default amount is X, and the amount of the recorded files stored in the storage space 121 with the lens number of "Video1" is Y. If Y≥X, the earliest recorded file among the recorded files with the lens number "Video1" is deleted. If Y<X, the earliest recorded file among the recorded files corresponding to another lens number and with an amount greater than X is deleted.

In response to the remaining capacity of the storage space 121 being no less than the total recording capacity, in step S215, the processor 110 performs loop recording through at least one lens 130 being driven and stores the currently recorded file. Afterwards, continue loop recording and return to step S210 to continuously monitor whether the remaining capacity is sufficient to store subsequent recorded files.

The processor 110 further determines whether the setting data of the lens 130 being driven is updated during the loop recording. In response to the setting data of the lens 130 being changed during the loop recording, the processor 110 has to recalculate the total recording capacity of the lens 130 being driven for loop recording. For example, assuming the file size of a newly recorded file of the first lens 130-1 calculated based on the updated setting data is 88 MB and the original recorded file size is 30 MB, it is necessary to delete three recorded files corresponding to the first lens 130-1 in the storage space 121 at one time, so as to ensure sufficient space for completely storing the next recorded file. If there are insufficient recorded files corresponding to the first lens 130-1 in the storage space 121 to be deleted, the recorded files corresponding to another lens are deleted instead.

In the following, examples are given for driving one lens 130 and driving multiple lenses 130 respectively.

Figure 3:
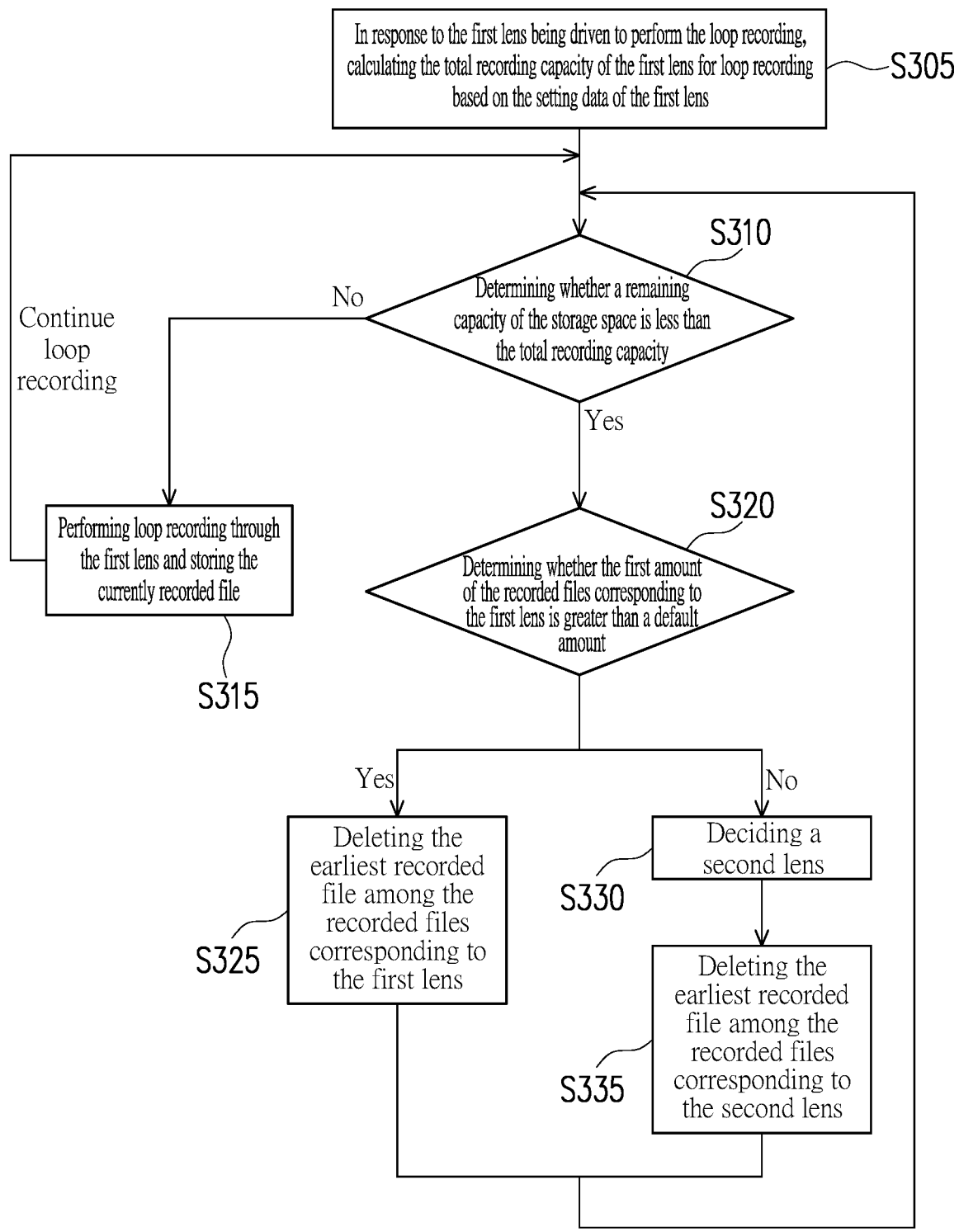
FIG. 3 is a flow diagram of the method for storing multi-lens recording file with a single lens being driven according to an embodiment of the disclosure.

FIG. 3 is a flow diagram of the method for storing multi-lens recording file with a single lens being driven according to an embodiment of the disclosure. In this embodiment, the first lens 130-1 is used as an example. Referring to FIG. 1 and FIG. 3, in step S305, in response to the first lens 130-1 being driven to perform loop recording, the processor 110 calculates the total recording capacity of the first lens 130-1 for loop recording based on the setting data of the first lens 130-1. That is, the file size of a single recording of the first lens 130-1 is set as the total recording capacity.

Next, in step S310, the processor 110 determines whether the remaining capacity of the storage space 121 is less than the total recording capacity.

In response to the remaining capacity of the storage space 121 being no less than the total recording capacity, in step S315, the processor 110 performs loop recording through the first lens 130-1 being driven and stores the currently recorded file. Afterwards, continue loop recording and return to step S210 to continuously monitor whether the remaining capacity is sufficient to store subsequent recorded files of the first lens 130-1.

In response to the remaining capacity of the storage space 121 being less than the total recording capacity, in step S320, the processor 110 determines whether the first amount of the recorded files corresponding to the first lens 130-1 stored in the storage space 121 is greater than the default amount based on the lens number of the first lens 130-1.

In response to the first amount being greater than the default amount, in step S325, the earliest recorded file among the recorded files corresponding to the first lens 130-1 is deleted by the processor 110 based on the recording time. Afterwards, return to step S310 until the remaining capacity of the storage space 121 is no less than the total recording capacity.

In addition, in response to the first amount not being greater than the default amount, in step S330, the processor 110 decides a second lens 130-2 among the other remaining lenses. The processor 110 finds another lens (assumed to be the second lens 130-2 here) with a second amount of the corresponding recorded file thereof greater than the default amount among other lenses. That is, the second amount of the recorded files corresponding to the second lens 130-2 stored in the storage space 121 is greater than the default amount.

After that, in step S335, the processor 110 deletes the earliest recorded file among the recorded files corresponding to the second lens 130-2 based on the recording time. In addition, in other embodiments, the processor 110 may also delete the recorded file with the largest file size among the recorded files corresponding to the second lens 130-2 based on the file size. Afterwards, return to step S310 until the remaining capacity of the storage space 121 is no less than the total recording capacity.

Figure 4:
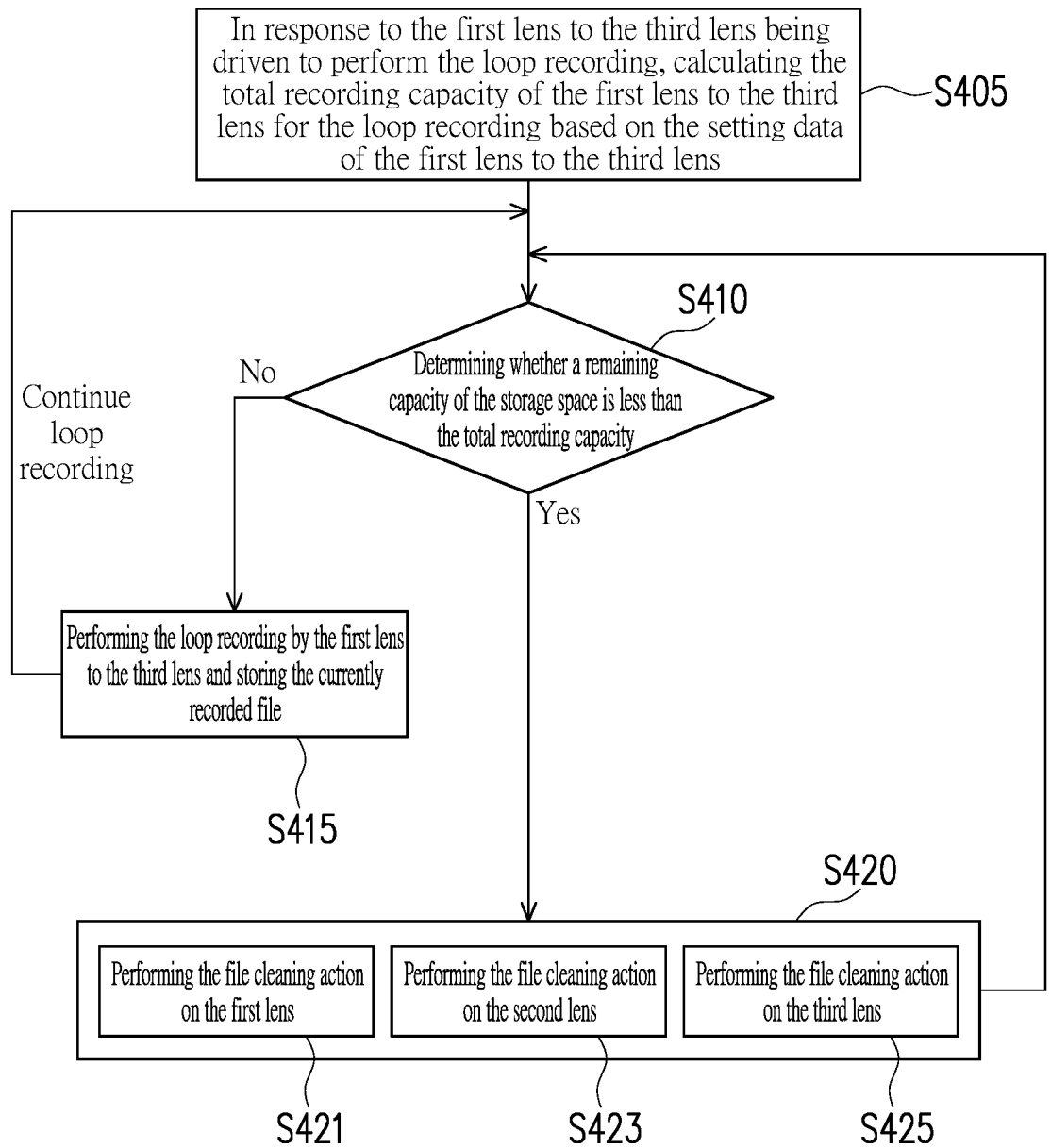
FIG. 4 is a flow diagram of the method for storing multi-lens recording file with multiple lenses being driven according to an embodiment of the disclosure.

FIG. 4 is a flow diagram of the method for storing multi-lens recording file with multiple lenses being driven according to an embodiment of the disclosure. In this embodiment, the first lens 130-1 to the third lens 130-3 are used as examples. Referring to FIG. 1 and FIG. 4, in step S405, in response to the first lens 130-1 to the third lens 130-3 being driven to perform loop recording, the processor 110 calculates the total recording capacity of the first lens 130-1 to the third lens 130-3 for loop recording based on the setting data of the first lens 130-1 to the third lens 130-3. That is, the total recording capacity is set as the sum of the file sizes of the recorded files recorded individually by the first lens 130-1 to the third lens 130-3.

Next, in step S415, the processor 110 performs loop recording by the first lens 130-1 to the third lens 130-3 and stores the currently recorded file. Afterwards, continue loop recording and return to step S410 to continuously monitor whether the remaining capacity is sufficient to store subsequent recorded files of the first lens 130-1 to the third lens 130-3.

In response to the remaining capacity of the storage space 121 being less than the total recording capacity, in step S420, the processor 110 performs a file cleaning action on the recorded files corresponding to the first lens 130-1 to the third lens 130-3, respectively, based on the lens numbers of the first lens 130-1 to the third lens 130-3. Step S420 includes step S421, step S423, and step S425. For the file cleaning action of step S421, step S423, and step S425, please refer to the file cleaning action of step S320 to step S335. In step S421, step S423, and step S425, the file cleaning action is performed on each of the first lens 130-1 to the third lens 130-3, respectively.

That is, whether the first amount of the recorded files corresponding to each of the first lens 130-1 to the third lens 130-3 stored in the storage space 121 is greater than default amount is determined based on the each of the lens numbers of the first lens 130-1 to the third lens 130-3. In response to the first amount being greater than the default amount, the earliest recorded file among each of the recorded files corresponding to the first lens 130-1 to the third lens 130-3 is deleted based on the recording time.

For lenses for which the first amount is not greater than the default amount, the earliest recorded file among the recorded files corresponding to another lens stored in the storage space 121 is deleted based on the recording time. Alternatively, a recorded file with a largest file size among the recorded files corresponding to another lens stored in the storage space 121 is deleted based on a file size. The second amount of the recorded files corresponding to the another lens stored in the storage space 121 is greater than the default amount.

In an embodiment, queues corresponding to the first lens 130-1 to the third lens 130-3 may be set up in the storage 120 to respectively record the file information of the recorded files stored in the storage space 121 by the first lens 130-1 to the third lens 130-3. The file information includes the file name, the lens number, the recording time, and the file size. In an embodiment, the file name may be set to be associated with the lens number and the recording time, for example, "lens number_recording date_recording start time". For example, assuming that the lens number of the first lens 130-1 is "Video1" and the recording starts at 10:29:30 AM on Jun. 29, 2022, the file name of the recorded file is, for example, "Video1_2022-06-29_10-29-30". However, this is for illustrative purposes only and not as a limitation.

The processor 110 records the file name into a corresponding queue based on the lens number. For the file name "Video1_2022-06-29_10-29-30", in response to storing the corresponding recorded file in the storage space 121, the processor 110 records the file name correspondingly to the queue of the first lens 130-1 according to the lens number "Video1". In addition, in response to deleting the recorded file corresponding to the file name "Video1_2022-06-29_10-29-30" from the storage space 121, the processor 110 deletes the file name from the queue of the first lens 130-1.

In response to the processor 110 determining that the remaining capacity of the storage space 121 is insufficient to store the file of the next loop recording, the processor 110 may first read each of the queues to determine the amount of the recorded file stored in the storage space 121 by each of the lenses 130. The file name tells the recording time of each of the recorded files, so that the earliest recorded file is found accordingly. In addition, the file size and the file name of each of the recorded files may be further recorded in the corresponding queue, so that the recorded file with the largest file size may be found based on the records of the queue. To sum up, the disclosure estimates the file size of a single file recorded by each of the lenses according to the setting data of the lens being driven when the multi-lens recording apparatus is turned on, and reserve the required storage space to ensure that each of the lenses may record a complete file. Accordingly, it is possible to reserve sufficient space for the next recording before the storage space is full.

In addition, recorded files corresponding to each of the lenses being driven is deleted one by one, so that the number of files stored in the storage space of each of the lenses is balanced. Accordingly, the reserved storage space may be changed, and more storage space may be used for storage. The use of circuit boards may be reduced by using one circuit board to connect multiple lenses.

What is claimed is:

1. A method for storing multi-lens recording file, adapted for being executed by a processor, wherein the method comprises:

calculating a total recording capacity in response to one or multiple lenses among a plurality of lenses being driven to perform a loop recording, wherein each of the lenses has a lens number correspondingly, and calculating the total recording capacity comprises:
  in response to one lens among the plurality of lenses being driven to perform the loop recording, calculating a file size of a file recorded by the lens being driven based on setting data of the lens being driven and setting the file size as the total recording capacity; and
  in response to multiple lenses among the plurality of lenses being driven to perform the loop recording, calculating file sizes of files recorded individually by the multiple lenses being driven based on respective setting data of the multiple lenses being driven and setting sum of the file sizes as the total recording capacity;

after obtaining the total recording capacity, determining whether a remaining capacity of a storage space is less than the total recording capacity;

performing a file cleaning action on a plurality of recorded files stored in the storage space by the at least one lens in response to the remaining capacity being less than the total recording capacity, comprising: deleting at least one of the recorded files stored in the storage space based on a recording time and the lens number until the remaining capacity is no less than the total recording capacity; and performing the loop recording through the at least one lens being driven and storing a currently recorded file in response to the remaining capacity being no less than the total recording capacity.

2. The method for storing multi-lens recording file according to claim 1, wherein in response to a first lens among the lenses being driven, performing the file cleaning action comprises:

determining whether a first amount of the recorded files corresponding to the first lens stored in the storage space is greater than a default amount based on the lens number of the first lens; and deleting an earliest recorded file among the recorded files corresponding to the first lens based on the recording time in response to the first amount being greater than the default amount.

3. The method for storing multi-lens recording file according to claim 2, wherein after determining whether the first amount of the recorded files corresponding to the first lens stored in the storage space is greater than the default amount, further comprises:

deciding a second lens among remaining lenses of the lenses in response to the first amount not being greater than the default amount, wherein a second amount of the recorded files corresponding to the second lens stored in the storage space is greater than the default amount; and deleting the earliest recorded file among the recorded files corresponding to the second lens based on the recording time.

4. The method for storing multi-lens recording file according to claim 2, wherein after determining whether the first amount of the recorded files corresponding to the first lens stored in the storage space is greater than the default amount, further comprises:

deciding a second lens among remaining lenses of the lenses in response to the first amount not being greater than the default amount, wherein a second amount of the recorded files corresponding to the second lens stored in the storage space is greater than the default amount; and deleting a recorded file with a largest file size among the recorded files corresponding to the second lens based on a file size.

5. The method for storing multi-lens recording file according to claim 1, wherein in response to a plurality of lenses among the lenses being driven, performing the file cleaning action comprises:

determining, for each of the lenses being driven, whether a first amount of the recorded files corresponding to each of the lenses stored in the storage space is greater than a default amount based on the lens number of each of the lenses; and deleting an earliest recorded file among the recorded files corresponding to each of the lenses in response to the first amount being greater than the default amount based on the recording time.

6. The method for storing multi-lens recording file according to claim 5, wherein after determining whether the first amount of the recorded files corresponding to each of the lenses stored in the storage space is greater than the default amount, further comprises:

deleting, for lenses for which the first amount is not greater than the default amount, the earliest recorded file among the recorded files corresponding to another lens stored in the storage space based on the recording time, wherein a second amount of the recorded files corresponding to the another lens stored in the storage space is greater than the default amount.

7. The method for storing multi-lens recording file according to claim 5, wherein after determining whether the first amount of the recorded files corresponding to each of the lenses stored in the storage space is greater than the default amount, further comprises:

deleting, for lenses for which the first amount is not greater than the default amount, a recorded file with a largest file size among the recorded files corresponding to another lens stored in the storage space based on a file size, wherein a second amount of the recorded files corresponding to the another lens stored in the storage space is greater than the default amount.

8. The method for storing multi-lens recording file according to claim 1, wherein the setting data comprises a resolution, frames per second, a loop recording time, and a file compression format, wherein calculating the total recording capacity of the at least one lens for the loop recording comprises:

calculating a file size correspondingly based on the resolution, the frames per second, the loop recording time, and the file compression format corresponding to each of the at least one lens being driven; and obtaining the total recording capacity by summing up the file size corresponding to the lens being driven.

9. The method for storing multi-lens recording file according to claim 1, further comprising:

setting up a plurality of queues respectively for the lenses, wherein each of the queues is configured to record file information of the recorded file stored in the storage space by each of the lenses.

10. The method for storing multi-lens recording file according to claim 1, further comprising:

determining whether the setting data of the lens being driven is updated; and recalculating the total recording capacity for the loop recording of the lens in response to the setting data being updated.

11. A multi-lens recording apparatus comprising:

a plurality of lenses;

a storage, comprising a storage space;

a processor, coupled to the lenses and the storage and configured to:

calculate a total recording capacity in response to one or multiple lenses among the plurality of lenses being driven to perform a loop recording, wherein each of the lenses has a lens number correspondingly, and calculating the total recording capacity comprises:

in response to one lens among the plurality of lenses being driven to perform the loop recording, calculate a file size of a file recorded by the lens being driven based on setting data of the lens being driven and set the file size as the total recording capacity; and in response to multiple lenses among the plurality of lenses being driven to perform the loop recording, calculate file sizes of files recorded individually by the multiple lenses being driven based on respective setting data of the multiple lenses being driven and set sum of the file sizes as the total recording capacity;

after obtaining the total recording capacity, determine whether a remaining capacity of the storage space is less than the total recording capacity;

perform a file cleaning action on a plurality of recorded files stored in the storage space by the at least one lens in response to the remaining capacity being less than the total recording capacity, which comprises: deleting at least one of the recorded files stored in the storage space based on a recording time and the lens number until the remaining capacity is no less than the total recording capacity; and perform the loop recording through the at least one lens being driven and store a currently recorded file in response to the remaining capacity being no less than the total recording capacity.

12. The multi-lens recording apparatus according to claim 11, wherein in response to a first lens among the lenses being driven, the processor is configured to:

determine whether a first amount of the recorded files corresponding to the first lens stored in the storage space is greater than a default amount based on the lens number of the first lens; and delete an earliest recorded file among the recorded files corresponding to the first lens based on the recording time in response to the first amount being greater than the default amount.

13. The multi-lens recording apparatus according to claim 12, wherein in response to the first lens among the lenses being driven, the processor is configured to:

decide a second lens among remaining lenses of the lenses in response to the first amount not being greater than the default amount, wherein a second amount of the recorded files corresponding to the second lens stored in the storage space is greater than the default amount; and delete the earliest recorded file among the recorded files corresponding to the second lens based on the recording time.

14. The multi-lens recording apparatus according to claim 12, wherein in response to the first lens among the lenses being driven, the processor is configured to:

decide a second lens among remaining lenses of the lenses in response to the first amount not being greater than the default amount, wherein a second amount of the recorded files corresponding to the second lens stored in the storage space is greater than the default amount; and delete a recorded file with a largest file size among the recorded files corresponding to the second lens based on a file size.

15. The multi-lens recording apparatus according to claim 11, wherein in response to a plurality of lenses among the lenses being driven, the processor is configured to:

determine, for each of the lenses being driven, whether a first amount of the recorded files corresponding to each of the lenses stored in the storage space is greater than a default amount based on the lens number of each of the lenses; and delete an earliest recorded file among the recorded files corresponding to each of the lenses in response to the first amount being greater than the default amount based on the recording time.

16. The multi-lens recording apparatus according to claim 15, wherein in response to a plurality of lenses among the lenses being driven, the processor is configured to:

delete, for lenses for which the first amount is not greater than the default amount, the earliest recorded file among the recorded files corresponding to another lens stored in the storage space based on the recording time, wherein a second amount of the recorded files corresponding to the another lens stored in the storage space is greater than the default amount.

17. The multi-lens recording apparatus according to claim 15, wherein in response to a plurality of lenses among the lenses being driven, the processor is configured to:

delete, for lenses for which the first amount is not greater than the default amount, a recorded file with a largest file size among the recorded files corresponding to another lens stored in the storage space based on a file size, wherein a second amount of the recorded files corresponding to the another lens stored in the storage space is greater than the default amount.

18. The multi-lens recording apparatus according to claim 11, wherein the setting data comprises a resolution, frames per second, a loop recording time, and a file compression format, and the processor is configured to:

calculate a file size correspondingly based on the resolution, the frames per second, the loop recording time, and the file compression format corresponding to each of the at least one lens being driven; and obtain the total recording capacity by summing up the file size corresponding to the lens being driven.

19. The multi-lens recording apparatus according to claim 11, wherein the processor is further configured to:

set up a plurality of queues respectively for the lenses in the storage, wherein each of the queues is configured to record file information of the recorded file stored in the storage space by each of the lenses.

20. The multi-lens recording apparatus according to claim 11, wherein the processor is further configured to:

determine whether the setting data of the lens being driven is updated; and recalculate the total recording capacity for the loop recording of the lens in response to the setting data being updated.

* * * * *